US012281761B1

(12) United States Patent
Huang

(10) Patent No.: US 12,281,761 B1
(45) Date of Patent: Apr. 22, 2025

(54) BIRTHDAY CANDLE WITH AUTOMATIC LIGHTING EFFECT

(71) Applicant: Liwei Huang, Shenzhen (CN)

(72) Inventor: Liwei Huang, Shenzhen (CN)

(*) Notice: Subject to any disclaimer, the term of this patent is extended or adjusted under 35 U.S.C. 154(b) by 0 days.

(21) Appl. No.: 18/655,532

(22) Filed: May 6, 2024

(30) Foreign Application Priority Data

Mar. 28, 2024 (CN) ......................... 202420623361.0

(51) Int. Cl.

| | |
|---|---|
| ***F21L 27/00*** | (2006.01) |
| ***A47G 19/30*** | (2006.01) |
| ***C11C 5/00*** | (2006.01) |
| ***F21L 4/02*** | (2006.01) |
| ***F21L 19/00*** | (2006.01) |
| ***F21V 23/00*** | (2015.01) |
| ***F21V 23/04*** | (2006.01) |
| ***F21V 33/00*** | (2006.01) |
| ***F21V 35/00*** | (2006.01) |
| *F21W 121/00* | (2006.01) |
| *F21Y 101/00* | (2016.01) |
| *F21Y 113/20* | (2016.01) |
| *H05B 47/11* | (2020.01) |

(52) U.S. Cl.

CPC .............. *F21L 27/00* (2013.01); *A47G 19/30* (2013.01); *C11C 5/008* (2013.01); *F21L 4/02* (2013.01); *F21L 19/00* (2013.01); *F21V 23/005* (2013.01); *F21V 23/0464* (2013.01); *F21V 33/0056* (2013.01); *F21V 35/00* (2013.01); *A47G 2200/085* (2013.01); *A47G 2200/143* (2013.01); *A47G 2400/061* (2013.01); *F21W 2121/002* (2013.01); *F21Y 2101/00* (2013.01); *F21Y 2113/20* (2016.08); *H05B 47/11* (2020.01)

(58) Field of Classification Search

CPC ........... F21L 27/00; F21L 19/00; C11C 5/008; F21V 23/005; F21V 23/0464; F21V 35/00

See application file for complete search history.

(56) References Cited

U.S. PATENT DOCUMENTS

| | | | | |
|---|---|---|---|---|
| 5,015,175 A * | 5/1991 | Lee | ......................... | F21S 6/001 431/253 |
| 2002/0093834 A1 | 7/2002 | Yu et al. | | |
| 2007/0072139 A1 * | 3/2007 | Xenakis | .................... | F23D 3/16 431/289 |

(Continued)

FOREIGN PATENT DOCUMENTS

EP 4137741 A1 2/2023

*Primary Examiner* — Christopher E Dunay

(74) *Attorney, Agent, or Firm* — Hemisphere Law, PLLC; Zhigang Ma

(57) ABSTRACT

A birthday candle with an automatic lighting effect mainly includes a candle body, a wick connected to the candle body with an end protruding outside an upper end of the candle body, a light sensor configured in the candle body at a position close to the wick and configured for detecting light generated by the wick when the wick burns, a light source, and a control circuit board electrically connected with the light sensor and the light source. The control circuit board is used for controlling the light source according to signals output from the light sensor. The control circuit board turns on the light source once the wick burns and turns off the light source once the wick is extinguished, such that the light source can work synchronously and coordinately along with the wick.

9 Claims, 4 Drawing Sheets

(56) References Cited

U.S. PATENT DOCUMENTS

| | | | | |
|---|---|---|---|---|
| 2012/0315589 | A1 | 12/2012 | Lee | |
| 2013/0016495 | A1* | 1/2013 | Lee | F21V 35/00<br>362/86 |
| 2016/0257909 | A1* | 9/2016 | Lee | C11C 5/00 |
| 2019/0338943 | A1* | 11/2019 | Putnam | C11C 5/006 |
| 2022/0082224 | A1* | 3/2022 | Cho | G02B 6/0008 |
| 2024/0102645 | A1* | 3/2024 | Butler | F21V 23/0471 |

* cited by examiner

BIRTHDAY CANDLE WITH AUTOMATIC LIGHTING EFFECT

CROSS-REFERENCE TO RELATED APPLICATIONS

The present application claims priority of China Patent Application No. 202420623361.0, filed on Mar. 28, 2024, the contents of which are incorporated herein by reference

Background of the Invention

Birthday candles are necessary decorations in birthday celebrations, which are inserted into birthday cakes. Existing birthday candles are mainly made of paraffin. They are generally in a shape of a flat-bottomed column with wicks in their middle portions. The birthday candles can be used by igniting the wicks exposed on upper ends of candle bodies. Their functions and shapes are relatively simple, such that their ornamental and atmosphere contrast effects are limited.

SUMMARY OF THE INVENTION

An objective of the present disclosure is to provide a birthday candle with an automatic lighting effect, which has rich functions.

The birthday candle with an automatic lighting effect includes a candle body made of paraffin wax, a wick connected to the candle body with an upper end thereof protruding outside an upper end of the candle body, a light sensor configured in the candle body at a position close to the wick and configured for detecting light generated by the wick when the wick burns, a light source, and a control circuit board electrically connected with the light sensor and the light source. The wick is made of flammable material. The control circuit board is configured for controlling the light source according to signals output from the light sensor. The control circuit board turns on the light source once the wick burns and turns off the light source once the wick is extinguished. The candle body defines a hollow channel that extends from the bottom up. An upper end of the hollow channel is under an lower end of the wick. The hollow channel has an opening at a bottom end thereof, and an irradiation direction of the light source is directed toward the interior of the hollow channel.

As an implementation, the opening runs through a bottom end of the candle body.

As an implementation, the light source is located at the opening.

As an implementation, the light sensor is close to a middle part of the wick.

As an implementation, the birthday candle further includes a sounder electrically connected with the control circuit board. The sounder is mounted on the control circuit board by means of a wire or directly. The control circuit board controls the sounder to be turned on according to an ignition state of the wick, such that the light source and the sounder work synchronously and coordinately along with the light of the wick.

As an implementation, the wick has a fixed length. Natural burning time of the wick is longer than a playing time of songs or melodies pre-stored in the control circuit board.

As an implementation, the candle body defines a mounting cavity at a bottom end thereof. The hollow channel extends from the mounting cavity up. The mounting cavity communicates with the hollow channel via the opening. The control circuit board is mounted in the mounting cavity, and the light source is fixed on the control circuit board. The light source is at least in the mounting cavity.

As an implementation, the candle body is in a number or letter or ornament shape.

As an implementation, birthday candle further includes a base connected to a bottom end of the candle body to support the candle body to be stably placed or inserted into a birthday cake. The control circuit board is connected to the base.

The birthday candle of the present invention enriches functions of a birthday candle product. When the wick burns, the candle body may also give out light, and works synchronously and coordinately along with the wick. The shape of the birthday candle may be number, letter or other shapes related to birthdays. The birthday candle not only increases the birthday atmosphere, but also more beautiful.

BRIEF DESCRIPTION OF DRAWINGS

The foregoing and other exemplary purposes, aspects and advantages of the present invention will be better understood in principle from the following detailed description of one or more exemplary embodiments of the invention with reference to the drawings, in which.

DETAILED DESCRIPTION OF THE INVENTION

The invention will now be described in detail through several embodiments with reference to the accompanying drawings.

First Embodiment

Figure 1:
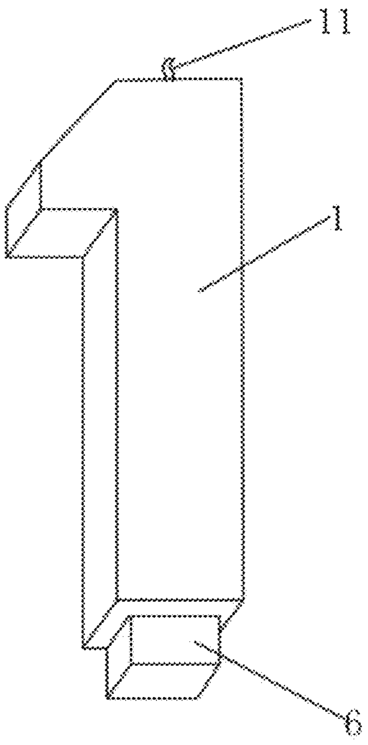
FIG. 1 is a perspective view of a birthday candle in accordance with a first embodiment of the present invention.
Figure 2:
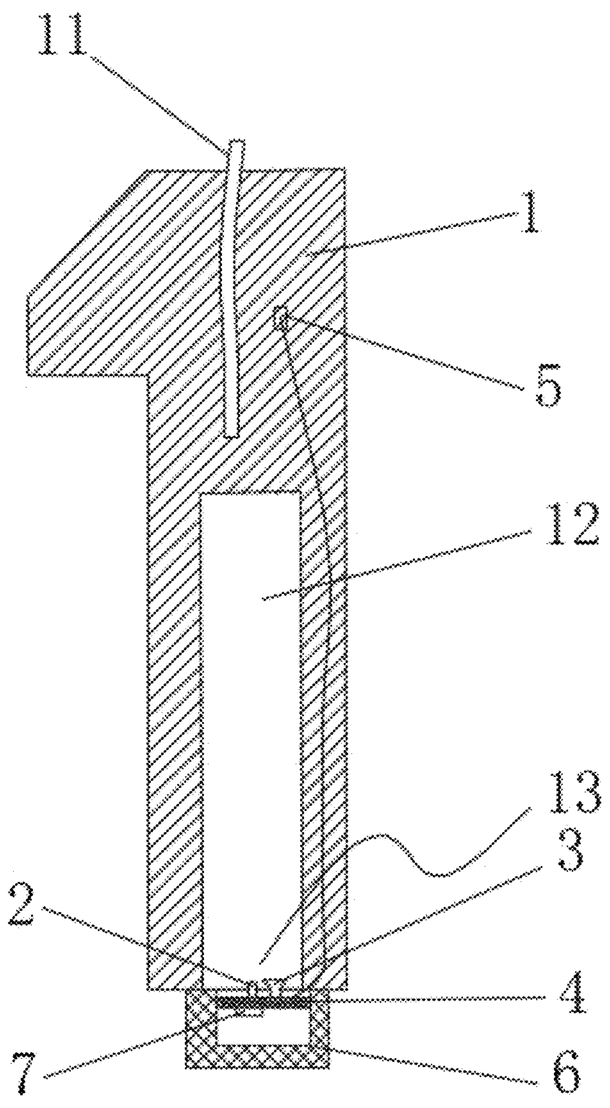
FIG. 2 is a profile view of the birthday candle in FIG. 1.

As shown in FIG. 1 and FIG. 2, a birthday candle with an automatic lighting effect according to the embodiment is in a shape of Arabic number one. The birthday candle mainly includes a candle body 1 with a combustible wick 11, a light source 2, a light sensor 5, a sounder 3, and a control circuit board 4 configured to control the light source 2 and the sounder 3 to work. The candle body 1 is in a shape of Arabic number one, and may be made of paraffin wax. An upper section of the candle body 1 is provided with a combustible wick 11. The wick 11 may be made of cotton. An upper end of the wick 11 is exposed from an upper end surface of the candle body 1, which facilitates ignition. The light sensor 5 is fixed at a position, close to a middle portion of the wick 11 (or close to a lower portion of the wick 11), in the candle body 1. The light sensor 5 is configured to sense a light ray emitted by the wick 11. The light sensor 5 is connected to the control circuit board 4. After the wick 11 is ignited, the light sensor 5 collects a light signal generated by burning of the wick 11, and transmits the signal to the control circuit board 4. Then, the control circuit board 4 controls the light source 2 and the sounder 3 to be turned on, such that the light source 2 and the sounder 3 work synchronously and coordinately along with light of the wick 11. That is, after the wick 11 is ignited, the light source 2 and the sounder 3 are turned on, and meanwhile, sound and light effects are achieved. Music played by the sounder 3 is pre-stored in the control circuit board 4, and may be a song or melody related to a birthday, such as a birthday song.

Luminous time of the light source 2 is consistent with burning time of the wick 11. That is, the light source 2 starts to work when the wick 11 is ignited, and the light source 2 is turned off when the wick 11 is extinguished (whether the wick is completely burned out or extinguished in advance).

Starting time of the sounder 3 is related to the wick 11. That is, the sounder 3 starts to play music or melody when the wick 11 is ignited. When playing of the music or melody is completed, the wick 11 is still burning. If the wick 11 is extinguished before playing of the music or melody is completed, the sounder 3 is turned off along with extinction of the wick 11. In this way, the wick 11 has a fixed length, and natural burning time of the wick 11 is longer than playing time of a song or melody pre-stored in the control circuit board 4, such that the above effect is achieved.

In the embodiment, the light source 1 may be a cold light source such as a low-power light-emitting diode (LED) lamp, the light sensor 5 may be a photoresistor, and the sounder 3 may be a buzzer or a small speaker.

In the embodiment, to enable the candle body 1 to have a desirable light show effect under light irradiation of the light source 2, a lower portion of the candle body 1 is hollow and internally provided with a hollow channel 12, and the irradiation channel 12 extends, from bottom to top, from a bottom end of the candle body to a position under the wick 11. A opening 13 is provided on a bottom end surface of the candle body 1. The light source 2 is located at the opening 13. An irradiation direction of the light source 2 is upward along the hollow channel 12. When the light source 2 emits light, a light ray enters, from the bottom to the top, the hollow channel 12 from the opening 13, such that the entire candle body 1 has a lighting effect from inside to outside.

In the embodiment, a base 6 is arranged under the candle body 1 and allows the candle body 1 to be stably placed or inserted into a birthday cake. The control circuit board 4 is fixed to the base 6. The sounder 3 is directly mounted on the control circuit board 4. The light source 2 may be directly mounted on the control circuit board 4 or mounted at the opening 13 through extension with a wire.

Figure 3:
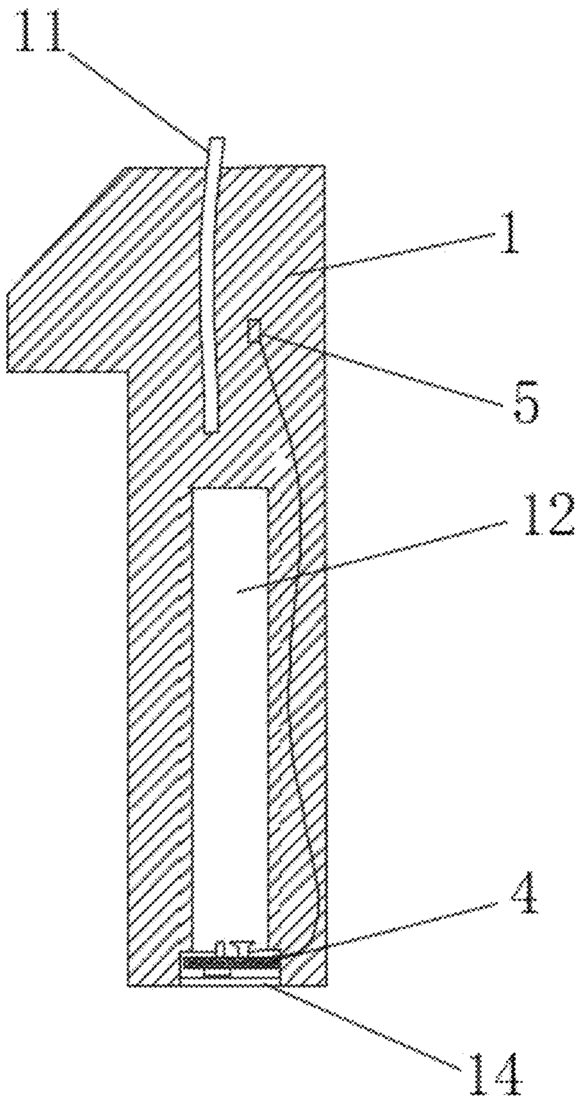
FIG. 3 is a profile view of a birthday candle in accordance with a derivative embodiment of the first embodiment of the present invention.

Understandably, the control circuit board 4 may be mounted in a preset mounting cavity 14 of the candle body in a derivative embodiment of the first embodiment, as shown in FIG. 3.

In the embodiment, the control circuit board 4 is further provided with a storage battery 7. The storage battery is configured to drive the entire circuit board, the light source 2 and the sounder 3 to work.

The technology of the patent application enriches functions of a birthday candle product, integrates sound and light effects, and automatically turns on and off sound and light along with ignition and extinguishing of the wick by controlling a length of the wick and time of the sound and the light. The product has no base, a lighting channel, and a firework effect, involves music, and limits the length of the wick to correspond to music time. The product is only applied to number, letter and other shapes related to birthdays.

Second Embodiment

Figure 4:
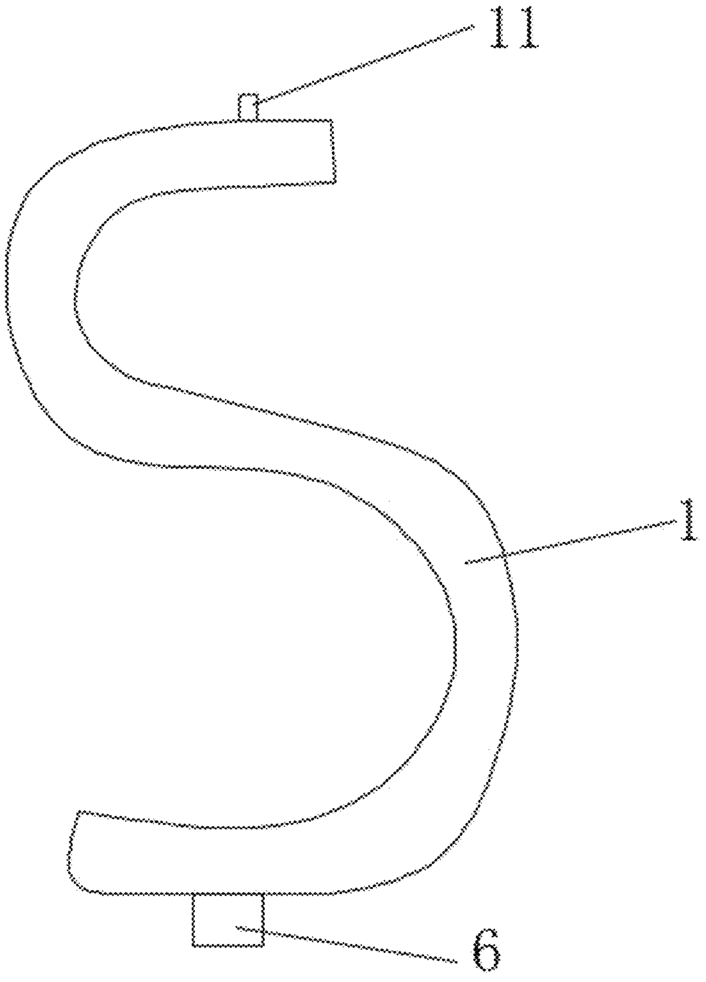
FIG. 4 is a schematic structural diagram of a birthday candle in accordance with a second embodiment of the present invention.

In addition to the above embodiment, when the candle body 1 of the present disclosure is in a shape of letter S, the candle only needs to be specifically implemented by shaping the candle body 1 into the shape of letter S based on the first embodiment, as shown in FIG. 4. Other assemblies and working principles are consistent with those of the first embodiment, which will not be repeated herein.

THIRD EXAMPLE

In addition to the above embodiment, the present disclosure may only have a lighting effect without a sound effect, and only needs to be specifically implemented by removing a sounder 3 based on the first embodiment. Other assemblies and working principles are consistent with those of the first embodiment, which will not be repeated herein.

In addition to shapes disclosed in the above embodiments, a shape of a candle body 1 of the present disclosure may be another shape of a letter or number, such as any of natural numbers 0-9 or any of letters A-Z. Certainly, the candle body may be in various other ornament shapes that may be inserted into a cake, such as figure, animal, cartoon and other ornament shapes.

In the description of the present disclosure, it should be understood that orientations or positional relations indicated by the terms "upper", "lower", "front", "rear", "left", "right", "vertical", "horizontal", "top", "bottom", "inside", "outside", etc. are based on the orientations or positional relations shown in the accompanying drawings and are merely for facilitating the description of the present disclosure and simplifying the description, rather than indicating or implying that a device or element referred to necessarily have a particular orientation or be constructed and operated in a particular orientation, and therefore will not be interpreted as limiting the present disclosure.

In the present disclosure, unless expressly specified and defined otherwise, the terms "mount", "connect", "connected", "fix", etc. are to be construed broadly and may denote, for instance, fixed connection, detachable connection, integrated connection, mechanical connection, electrical connection, direct connection, indirect connection through an intermediate medium, communication between interiors of two elements, or interaction between two elements. Those of ordinary skill in the art may understand the specific meanings of the above terms in the present disclosure on a case-by-case basis.

While the invention has been described in terms of several exemplary embodiments, those skilled on the art will recognize that the invention can be practiced with modification within the spirit and scope of the appended claims. In addition, it is noted that, the Applicant's intent is to encompass equivalents of all claim elements, even if amended later during prosecution.

What is claimed is:

1. A birthday candle with an automatic lighting effect, comprising:

a candle body (1) made of paraffin wax;

a wick (11) made of flammable material, connected to the candle body with an upper end thereof protruding outside an upper end of the candle body;

a light sensor (5) fixed in the candle body at a position close to the wick and configured for detecting light generated by the wick when the wick burns;

a light source (2); and a control circuit board (4) electrically connected with the light sensor and the light source, and configured for controlling the light source according to signals output from the light sensor;

wherein the control circuit board turns on the light source once the wick burns and turns off the light source once the wick is extinguished;

wherein the candle body defines a hollow channel (12) that extends from the bottom up; an upper end of the hollow channel is under a lower end of the wick; the hollow channel has an opening (13) at a bottom end thereof, the light source is located at the opening and an irradiation direction of the light source is directed toward the interior of the hollow channel;

wherein a height of the wick is less than half a height of the candle body.

2. The birthday candle according to claim 1, wherein the opening (13) runs through a bottom end of the candle body.

3. The birthday candle according to claim 1, wherein the light sensor is close to a middle part of the wick.

4. The birthday candle according to claim 1, further comprising a sounder (3) electrically connected with the control circuit board; wherein the sounder is mounted on the control circuit board, and the control circuit board controls the sounder to be turned on according to an ignition state of the wick, such that the light source and the sounder work synchronously and coordinately along with the wick.

5. The birthday candle according to claim 4, wherein the wick has a fixed length, and a natural burning time of the wick is longer than a playing time of songs or melodies pre-stored in the control circuit board.

6. The birthday candle according to claim 1, wherein the candle body defines a mounting cavity (14) at a bottom end thereof; the hollow channel (12) extends from the mounting cavity up, the mounting cavity communicates with the hollow channel via the opening; the control circuit board is mounted in the mounting cavity, and the light source is fixed on the control circuit board.

7. The birthday candle according to claim 6, wherein the light source is at least in the mounting cavity.

8. The birthday candle according to claim 1, wherein the candle body is in a number or letter or ornament shape.

9. The birthday candle according to claim 1, wherein further comprising a base (6) connected to a bottom end of the candle body to support the candle body to be stably placed or inserted into a birthday cake, and the control circuit board is connected to the base.

* * * * *